(12) United States Patent
Rice et al.

(10) Patent No.: US 10,385,905 B1
(45) Date of Patent: Aug. 20, 2019

(54) BONDED HARDWARE RAPID CURE SYSTEM

(71) Applicant: Nona Composites, LLC, Miamisburg, OH (US)

(72) Inventors: Jason P. Rice, Dayton, OH (US); Mark C. Cridge, Centerville, OH (US)

(73) Assignee: Nona Composites, LLC, Miamisburg, OH (US)

( * ) Notice: Subject to any disclaimer, the term of this patent is extended or adjusted under 35 U.S.C. 154(b) by 97 days.

(21) Appl. No.: 15/688,177

(22) Filed: Aug. 28, 2017

Related U.S. Application Data

(60) Provisional application No. 62/379,948, filed on Aug. 26, 2016.

(51) Int. Cl.
*F16B 11/00* (2006.01)
*F16B 39/22* (2006.01)
*F16B 37/04* (2006.01)

(52) U.S. Cl.
CPC .......... *F16B 37/048* (2013.01); *F16B 11/006* (2013.01); *F16B 39/225* (2013.01)

(58) Field of Classification Search
CPC .............................. F16B 11/006; F16B 39/225
See application file for complete search history.

(56) References Cited

U.S. PATENT DOCUMENTS

| | | | | | |
|---|---|---|---|---|---|
| 5,013,391 | A | * | 5/1991 | Hutter, III | ......... B05C 17/00503 156/578 |
| 5,704,747 | A | * | 1/1998 | Hutter, III | ............. F16B 37/044 411/113 |
| 8,511,953 | B2 | * | 8/2013 | Roosa | ................... F16B 37/048 411/108 |
| 2017/0339749 | A1 | * | 11/2017 | Hutter, III | ............. F16B 11/006 |

OTHER PUBLICATIONS

Click Bond "Nutplates", http://www.clickbond.com/products/nutplates/.
Click Bond, "Click Bond Nutplate/Hysol 9309.03 Installation and Removal Procedure", ftp://sidads.colorado.edu/pub/DATASETS/nsidc0587_ICESAT_GLAS_LTA/Section1_Preflight-Pre-Operations%20Calibration/Click%20Bond%20Nutplate,%20Install%20and%20Removal.pdf, Released by GLAS CMO Dec. 9, 2002.

* cited by examiner

*Primary Examiner* — Jeffrey H Aftergut
(74) *Attorney, Agent, or Firm* — Dinsmore & Shohl LLP

(57) ABSTRACT

Embodiments of systems and methods for adhering hardware to a substrate, wherein the method comprises coupling the hardware with a rigid tube or an elastomeric tube, applying adhesive onto a bonding surface of the hardware, inserting the rigid tube or the elastomeric tube through an aperture of the substrate until a surface of the substrate contacts the bonding surface having adhesive applied thereon, and adhering the hardware to the substrate by applying localized heat through a heating component disposed within the rigid tube or the elastomeric tube.

26 Claims, 9 Drawing Sheets

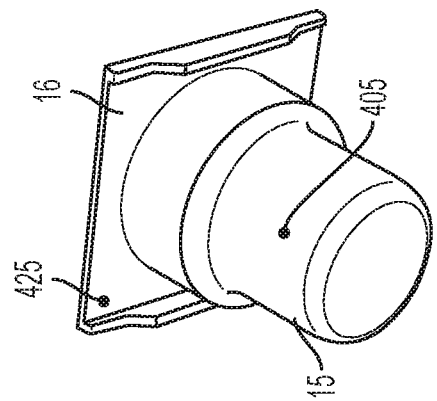
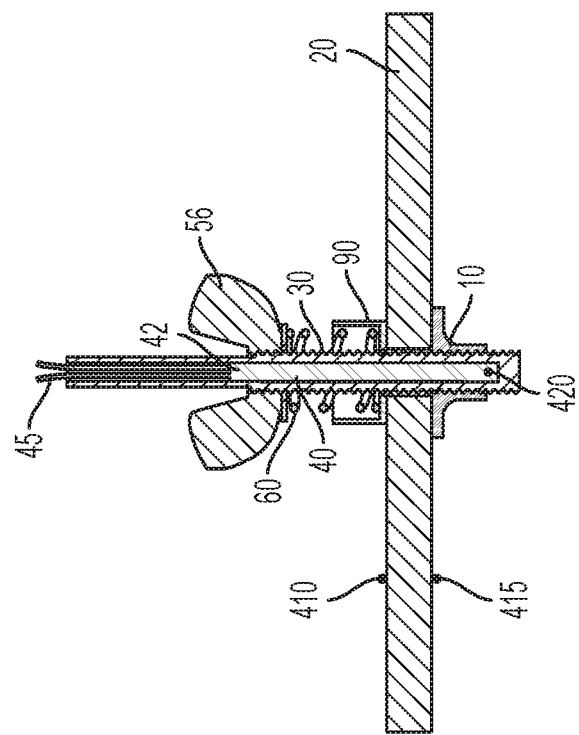

BONDED HARDWARE RAPID CURE SYSTEM

CROSS-REFERENCE TO RELATED APPLICATIONS

This application claims priority to U.S. Provisional Application 62/379,948 filed Aug. 26, 2016, which is incorporated by reference herein in its entirety.

STATEMENT REGARDING FEDERALLY SPONSORED RESEARCH OR DEVELOPMENT

This invention was made with Government support under Contract Number FA8650-16-M-5062 awarded by the U.S. Air Force Materiel Command to Cornerstone Research Group Inc. The Government has certain rights in the invention.

TECHNICAL FIELD

Embodiments described herein relate generally to rapid curing systems for bonding hardware to substrates or substructures.

BACKGROUND

Adhesively bonded hardware, which are fasteners such as nutplates, bushings, threaded inserts, sleeves, mounts, brackets, etc., are commonly used to secure structural elements during installation or repair. Bonded hardware is used on variety of systems including: aircraft, spacecraft, watercraft, automobiles, and industrial equipment. Adhesively bonded hardware is also used to join components of dissimilar materials or when welding or riveting is not an option. Bonded hardware typically experiences failure in the form of mechanical wear, structural deformation, or separation of the hardware from the mounting substrate (i.e., disbond).

Damaged hardware found during routine maintenance requires timely replacement and approved repair techniques often mandate the use of certified adhesives. Unfortunately, approved repair adhesives are typically those used during original factory installation. Approved hardware adhesives are generally two-part epoxies whose performance specifications are determined by a lengthy cure (e.g. 24 hour) at room temperature. This specific curing time is necessary for the adhesive to develop the strength required to hold the hardware in place for attaching other components (e.g., reattaching an access panel to an aircraft). This long cure time can negatively impact the system's availability.

To expedite bonded hardware installation and repair processes, supplemental heating has been considered in order to accelerate the curing rate of adhesives. However, the accelerated cure profile must be well controlled to achieve desired adhesive properties (e.g., tensile strength, shear strength, peel strength, etc.) and hardware load ratings (e.g., push-out force and maximum torque) while also preventing damage to the surrounding structure due to excessive temperature exposure. Moreover a potential safety hazard is present when delivering heat to bonding locations in an environment where flammable liquids or vapors are present (e.g. aircraft fuel bay).

Specifically, in the aerospace industry, nutplates are commonly attached to aircraft panels. In this case, the 24 hour curing time is highly problematic, because this long cure time can negatively impact the aircraft's availability. To expedite nutplate repair processes, supplemental heating has been considered in order to accelerate the curing rate of adhesives. However, the accelerated cure profile must be well controlled to achieve desired adhesive properties (e.g., tensile strength, shear strength, peel strength, etc.) and nutplate load ratings (e.g., push-out force and maximum torque) while also preventing damage to the surrounding structure due to excessive temperature exposure. Moreover, the delivery of heat to the bonded nutplate area poses issues, because delivering heat in an aircraft environment with flammable liquids or vapors present is a potential safety hazard.

Accordingly, there is a need for improved bonded hardware cure systems capable of reliably and safely reducing the adhesive cure time.

SUMMARY

Embodiments of the present disclosure meet those needs by providing a bonded hardware rapid cure system that applies localized heating through the body of the hardware and into the adhesive bondline (i.e., the adhesive interface between a structure and hardware). More specially, the hardware that can benefit from the use of the currently disclosed rapid cure system to adhesively bond with a structure is a nutplate. By significantly reducing the cure time for nutplate bonding in an aircraft panel, the present systems and methods minimize the time of unavailability for an aircraft.

According to one embodiment of the present disclosure, a method of adhering hardware to a substrate is provided. The method comprises coupling the hardware with a rigid tube or an elastomeric tube, applying adhesive onto a bonding surface of the hardware, inserting the rigid tube or the elastomeric tube through an aperture of the substrate until a surface of the substrate contacts the bonding surface having adhesive applied thereon, and adhering the hardware to the substrate by applying localized heat via heat conduction through a heating component disposed within the rigid tube or the elastomeric tube.

According to another embodiment, an adhesive bonded hardware cure system for securing hardware to a substrate comprising at least one aperture is provided. The hardware cure system comprises a rigid tube operable to engage the hardware at one end and extend through one aperture of the substrate, a securing mechanism proximate the rigid tube and configured to secure the hardware in contact with the substrate; and a heating component operable to deliver heat to a bonding surface of the hardware, wherein the heating component is operable to be removably inserted into the rigid tube or is coupled to the interior of the rigid tube.

According to a further embodiment, another adhesive bonded hardware cure system for securing hardware to a substrate comprising at least one aperture is provided. The hardware cure system comprises an elastomeric tube operable to: 1) engage the hardware at one end; 2) extend through an aperture of the substrate; and 3) secure the hardware in contact with the uncured adhesive on the substrate; and a heating component operable to deliver heat to a bonding surface of the nutplate, wherein the heating component is operable to be inserted into the elastomeric tube or is coupled to the interior of the elastomeric tube.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 7A is a schematic view of a nutplate retention system comprising thermocouples according to one or more embodiments of the present disclosure.

FIG. 7B is a schematic view of the outer surface of the nutplate utilized in the system embodiment depicted in FIG. 7A, wherein the nutplate includes multiple thermocouples on the outer surface according to one or more embodiments of the present disclosure.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Embodiments of the present disclosure are directed to adhesive bonded hardware cure systems and methods that apply localized heating through the body of the hardware and into the adhesive bondline (i.e., the adhesive interface between a structure and hardware). As used herein, "localized heating" means focused heating directed to the adhesive bondline, and limiting external heating by placing the heating component in the interior of a tube that is in direct contact with the hardware (e.g., nutplate), which allows efficient heat transfer through conduction to the adhesive bonding surface of the hardware. For illustration, we have included a discussion of embodiments of the adhesive bonded hardware cure system, specifically, adhesive bonded hardware cure systems wherein nutplates are adhered to panels (e.g., aircraft panels).

Figure 1:
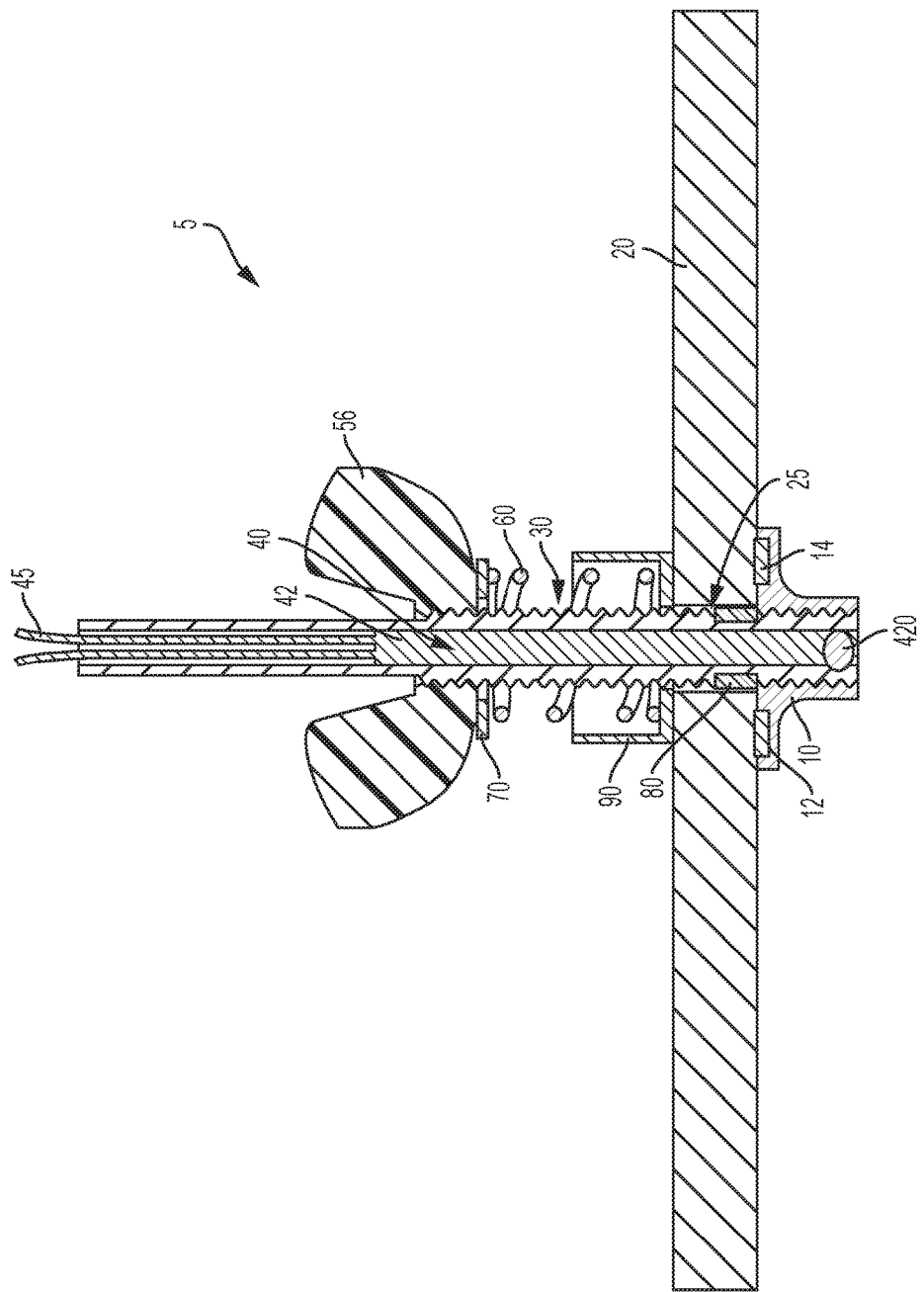
FIG. 1 is a cross-sectional view of a hardware cure system, specifically, a nutplate retention system adhering a nutplate to a panel according to one or more embodiments of the present disclosure.

Referring to the embodiment of FIG. 1, a nutplate retention system 5 for securing a nutplate 10 to a panel 20 is depicted. The nutplate retention system 5 enables application of localized heating to accelerate the curing rate of the adhesively bonded nutplates. As used herein, "localized heating" means focused heating directed to the adhesive bondline, and limiting external heating by placing the heating component in the interior of a tube that is in direct contact with the nutplate, which allows efficient heat transfer through heat conduction to the adhesive bonding surface of the nutplate. Alternate non-localized heating methods, such as the use of electric heating blanket, hot air with heat gun, and inductive heating on hardware on a metal substructure, will likely result in excessive or uncontrollable heating of the panel or substructure, which may continue to transfer heat into the bondline after a desirable cure state of the adhesive is achieved thereby resulting in undesirable adhesive or substructure material properties. In addition, operating these alternate heating methods is especially challenging when there is limited access to the back side portion of the structure during installation or repair, since the equipment needed for the alternate methods are generally bulky. Furthermore, the use of non-localized heating may cause potential safety hazard in an environment that has ignitable organic vapor.

Figure 3A:
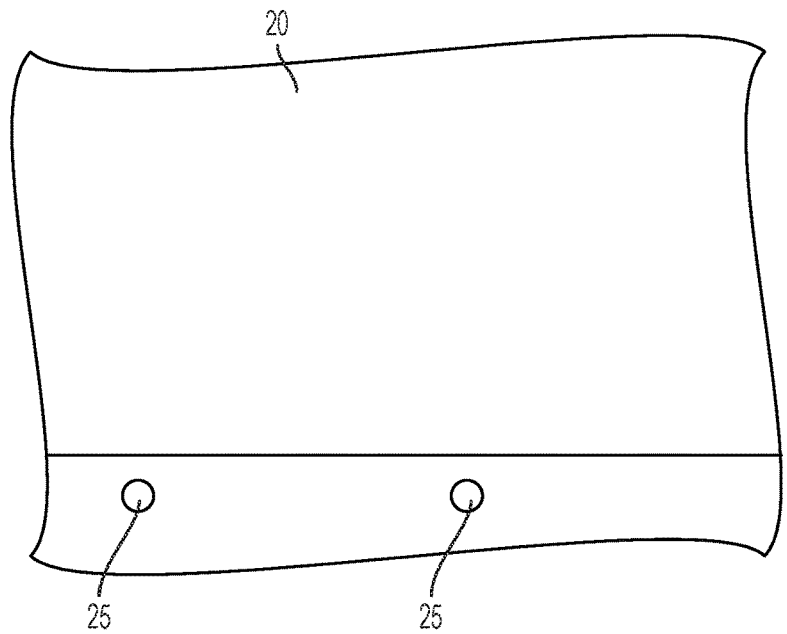
FIG. 3A is a schematic view of a panel having an aperture for subsequent attachment to the nutplate according to one or more embodiments of the present disclosure.

As shown in FIGS. 1 and 3A, the panel 20 comprises at least one aperture 25. Multiple apertures 25 are contemplated as shown in the embodiment of FIG. 3A.

Figure 2:
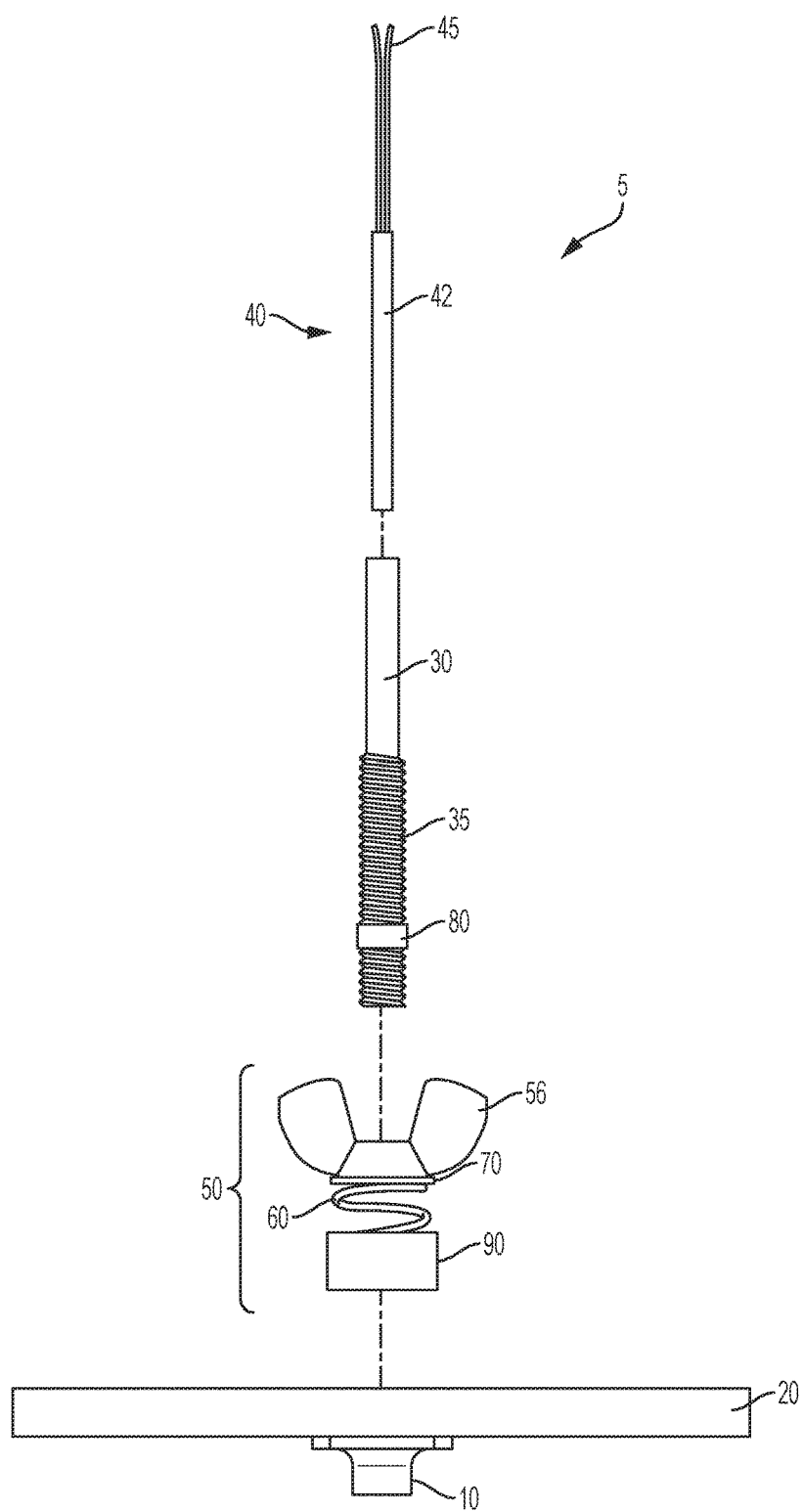
FIG. 2 is an exploded view of a nutplate retention system according to one or more embodiments of the present disclosure.

Referring to FIGS. 1 and 2, the nutplate retention system 5 comprises a rigid tube 30 operable to engage the nutplate 10 at one end and extend through one aperture 25 of the panel 20. As shown, the rigid tube 30 may comprise a threaded portion 35 for threadedly engaging the nutplate 10. Other fastening mechanisms besides threaded engagement of the rigid tube 30 and nutplate 10 are contemplated herein.

Optionally, the rigid tube 30 may also include a sleeve 80 disposed around a portion of the rigid tube 30. As shown in FIG. 1, the sleeve 80 helps secure the rigid tube 30 inside the aperture 25 of the panel 20. The sleeve 80 may also act as a seal to prevent adhesive migration into the nutplate threads above the panel 20 surface. In the embodiment of FIG. 2, the sleeve 80 may be disposed proximate the threaded portion 35 of the rigid tube 30.

Referring yet again to FIGS. 1 and 2, the nutplate retention system 5 comprises a securing mechanism proximate the rigid tube 30 to secure the nutplate 10 in contact with the panel 20. Various arrangements are contemplated for the securing mechanism relative to the rigid tube 30. In one embodiment, the securing mechanism is coaxially disposed around the rigid tube 30.

Additionally, the nutplate retention system 5 comprises a heating component 40 that delivers heat to a bonding surface 11 of the nutplate 10. In one or more embodiments, the heating component 40 is operable to be removably inserted into the rigid tube 30 or is coupled to the interior of the rigid tube 30. Without being bound by theory, placing the heating component 40 in the interior of the rigid tube 30 enables heat to be locally delivered to the adhesive bondline between the nutplate 10 and panel 20 via heat conduction. By providing localized heat, the concerns of providing heat in environments with flammable liquids or vapor is reduced or eliminated.

The heating component 40 may encompass various embodiments. In one embodiment, the heating component 40 comprises a joule heating element 42. Various materials are contemplated for the joule heating element 42, such as a nichrome wire. Additionally as shown in FIGS. 1 and 2, the heating component 40 may comprise a joule heating element 42 connected to power leads 45, which are connected to a power source. Any suitable power source that may deliver current is contemplated. The power leads 45 deliver current to the joule heating element 42, which then produces the heat used to accelerate the curing of the nutplate 10 to the panel 20.

As shown in the exploded view of FIG. 2, the heating component 40 may be removable from the rigid tube 30. In one embodiment, the removable heating component is a cartridge heater, which comprises a heating element within an enclosed heat conducting cartridge. Additional material such as thermal grease may be applied to the interface between the cartridge heater and the inside of the rigid tube 30 to increase the efficiency of heat transfer between the two components. Alternatively, it is contemplated that the heating component 40 may comprise a heating element integrated permanently in the interior of the rigid tube 30. In the heater embodiment, power and thermocouple wire connections may be added in order to interface with the heater controller system providing a feedback mechanism for the rapid cure process.

As used herein, "rigid tube" means an inflexible material and is in contrast to the rubbery "elastomeric tube" as described below. In one or more embodiments, the rigid tube 30 comprises a metal material. Various metals are contemplated as suitable, for example, aluminum or stainless steel.

Moreover, various materials are considered suitable for the panel 20. For example and not by way of limitation, the panel may comprise glass, ceramic composite, metal, plastic, aluminum, titanium, fiber reinforced polymer matrix composite, ceramic matrix composite, or combinations thereof.

Referring to the embodiments of FIGS. 1 and 7B, the nutplate 10 comprises an adhesive receptacle 12 as shown in FIG. 1 and a domed region 15 as depicted in the rotated nutplate view of FIG. 7B. The nutplate 10 comprises a hole 13 which aligns with the aperture 25 of the panel 20 during curing. Additionally, the adhesive receptacle 12 may be a recessed region where the adhesive 14 can be applied. The embodiment of FIG. 1 depicts the adhesive 14 applied in the adhesive receptacle 12 when the nutplate 10 is in contact with the panel 20. Various adhesives are considered suitable in the present embodiments, such as epoxy adhesives, acrylic adhesives, polyurethane adhesives or other adhesives known to the person skilled in the art.

Referring to the embodiment of FIGS. 1, 2, and 7A, the securing mechanism may comprise one or more holding components, typically used in tandem. As shown in FIG. 2, the one or more holding components 50 may comprise a threaded nut 56, at least one washer (e.g., a flat washer 70 and a cup washer 90), and a spring 60. As shown in FIG. 1, the threaded nut 56, which may comprise a wing nut, a hex nut, a square nut, a flange nut, a push nut, or slide nut, is threadedly coupled to the rigid tube 30, is used in conjunction with a flat washer 70 and cup washer 90 to apply force to compress the spring 60. The compressed spring 60 applies force against the panel 20 to ensure the nutplate 10, which is threadedly engaged to the rigid tube 30, remains in contact with the panel 20 during curing. Furthermore, the holding components 50 apply suitable clamping force to obtain a desired bondline thickness and prevent unwanted migration of adhesive.

Figure 5:
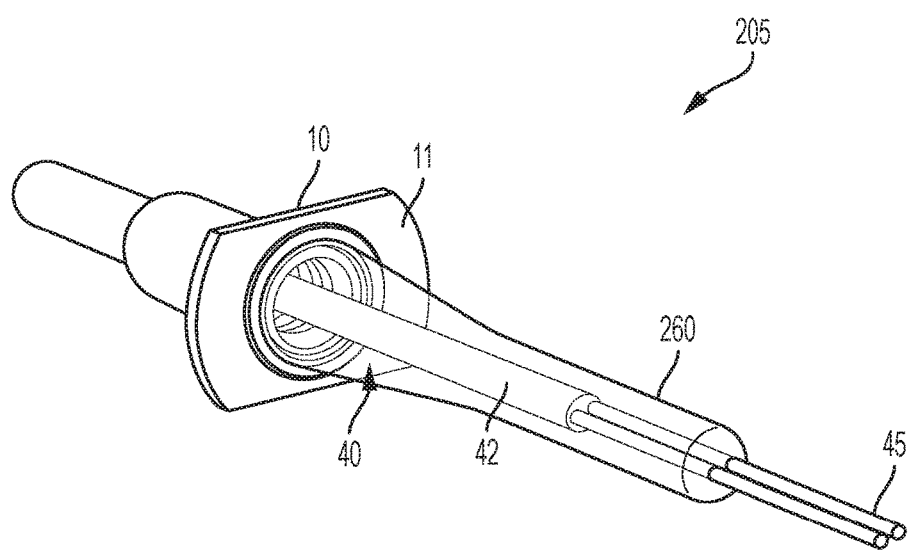
FIG. 5 is a schematic view of a nutplate retention system comprising an elastomeric tube according to one or more embodiments of the present disclosure.

In another embodiments as depicted in FIG. 5, the securing mechanism of the nutplate retention system 205 comprises an elastomeric tube 260 instead of the holding components 50 and the rigid tube 30 depicted in FIG. 2. In this embodiment, the elastomeric tube 260 at least partially surrounds the heating component 40. Specifically, in some embodiments, the elastomeric tube 260 may coaxially surround the joule heating element 42 of the heating component 40. The heating component 40 may be inserted or removed from the elastomeric tube 260. Additionally, it is contemplated that the heating component 40 could be coupled to the interior of the elastomeric tube 260.

As further shown in FIG. 5, the elastomeric tube 260 can have a bulkier section, which is slightly wider than the nutplate hole 13 or the inner diameter of the domed nutplate. Since the elastomeric tube 260 is elastic and compressible, it can be stretched and thinned out to be inserted through the nutplate hole 13 or squeezed into the domed nutplate. In both cases, the elastomeric material of the elastomeric tube 260 can hold the nutplate 10 against the panel 20 by friction and compression.

Figure 6:
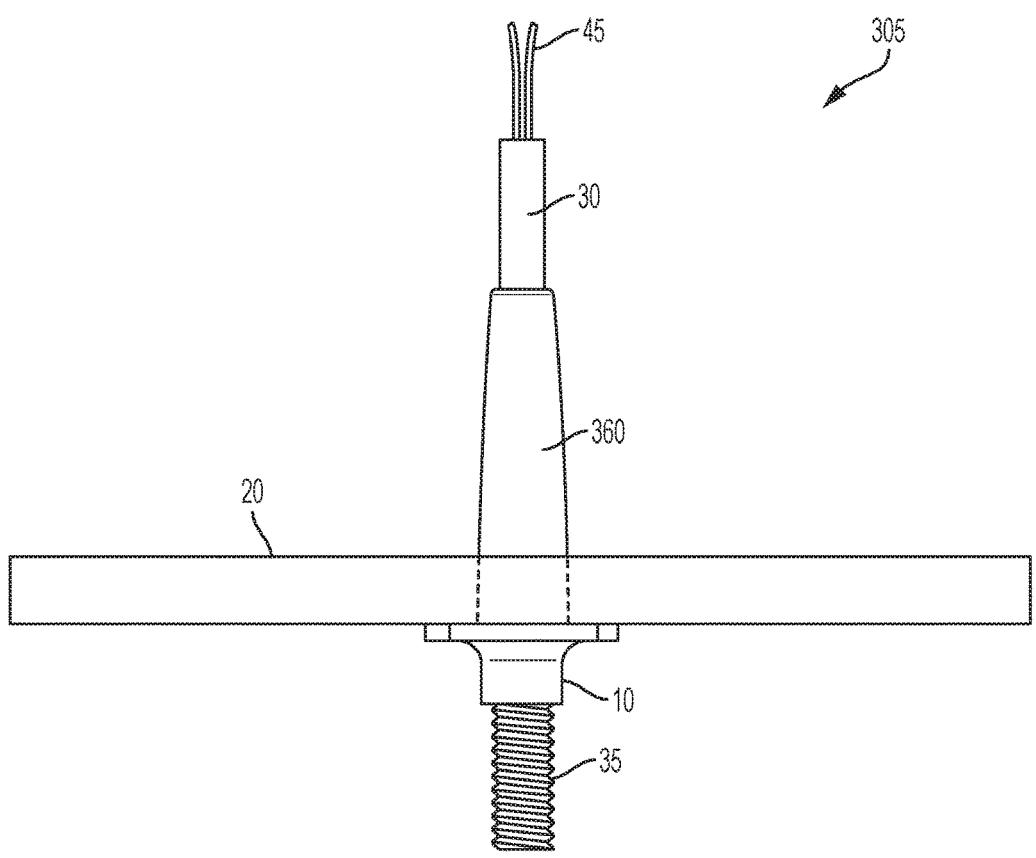
FIG. 6 is a schematic view of a nutplate retention system comprising an elastomeric tube coaxially surrounding a rigid tube according to one or more embodiments of the present disclosure.

Referring to the embodiment of FIG. 6, the securing mechanism may comprise an elastomeric tube 360 in conjunction with a rigid tube 30 (for example, a threaded rod). In this nutplate retention system 305, the rigid tube 30 threadedly engages the nutplate 10, and the elastomeric tube 360, which is disposed around the rigid tube 30 and within the panel's aperture, holds the nutplate 10 against the panel 20 by friction and compression.

Various materials are contemplated for the sleeve 80, or the elastomeric tubes 260 and 360 as depicted in FIGS. 1, 2, 5, and 6. These materials may include elastomer, thermoplastic, or combinations thereof. For example and not by way of limitation, the elastomer may include one or more components selected from silicone rubber, polyurethane elastomer, fluoroelastomer, and perfluoroelastomer. The thermoplastic may also comprise various materials familiar to the skilled person, such as polytetrafluoroethylene.

Turning from the above discussion of nutplate retention system components, the following discussion relates to the utilization of these components in processes for adhering a nutplate 10 to a panel 20. In one embodiment, the method comprises coupling the nutplate with a rigid tube or an elastomeric tube, applying adhesive onto a bonding surface of the nutplate, inserting the rigid tube or the elastomeric tube through an aperture of the panel until a surface of the panel contacts the bonding surface having adhesive applied thereon, and adhering the nutplate to the bonding surface of the panel by applying localized heat through a heating component disposed within the rigid tube or the elastomeric tube. Finally, the method further comprises removing the rigid tube or the elastomeric tube from the nutplate after the adhering step. The removal of the rigid tube may be achieved by unthreading the rigid tube from the nutplate by applying a torque. The removal of the elastomeric tube can be achieved by applying pulling force to disengage it from the nutplate.

Figure 3B:
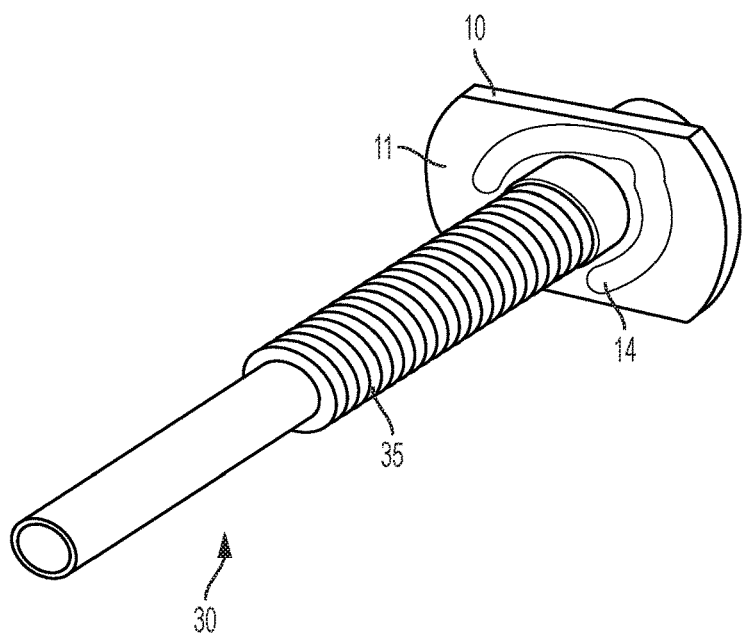
FIG. 3B is a schematic view of a subassembly of the nutplate retention system prior to insertion into a panel aperture of FIG. 3A according to one or more embodiments of the present disclosure.
Figure 3C:
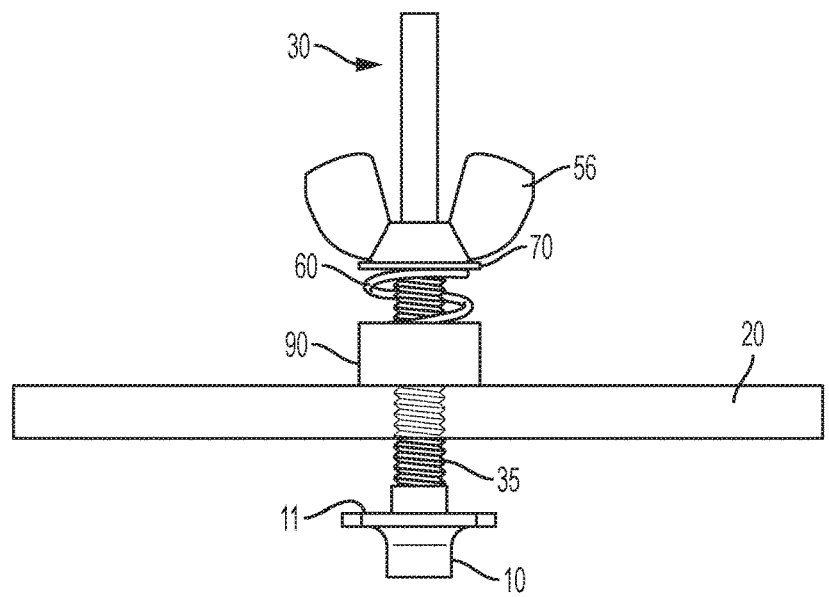
FIG. 3C is a schematic view of the nutplate retention system after insertion into a panel aperture of FIG. 3A, but prior to adhering the nutplate to the panel according to one or more embodiments of the present disclosure.
Figure 4:
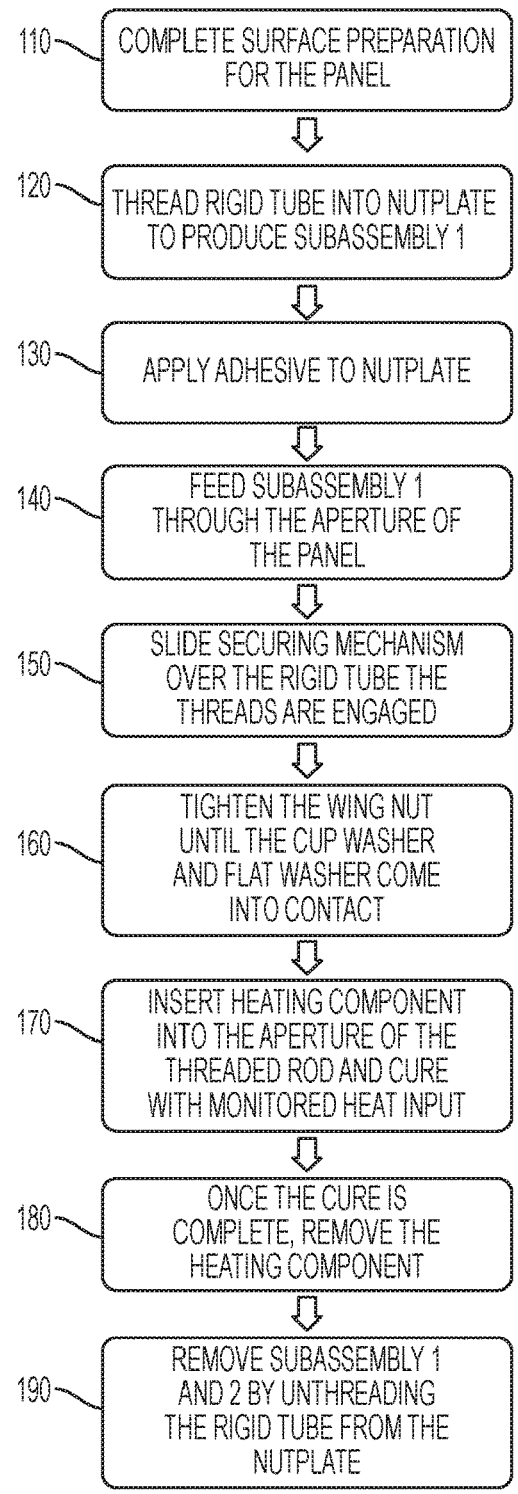
FIG. 4 is a flow diagram for one embodiment of adhering a nutplate to a panel according to one or more embodiments of the present disclosure.

In a specific embodiment as depicted in FIGS. 3A-3C and 4, the process may comprise preparing the surface of the panel 20 (FIG. 4, step 110). This may involve cleaning the panel 20 surface to facilitate better adhesion once the nutplate is adhesively bonded to the panel 20.

Referring again to FIG. 4, the rigid tube is then threaded into the nutplate (FIG. 4, step 120), and then adhesive is applied to the nutplate (FIG. 4, step 130; See also FIG. 3B). In specific embodiments, the rigid tube (e.g., the threaded tube) is inserted into a floating nut element of the nutplate 10.

Figure 3D:
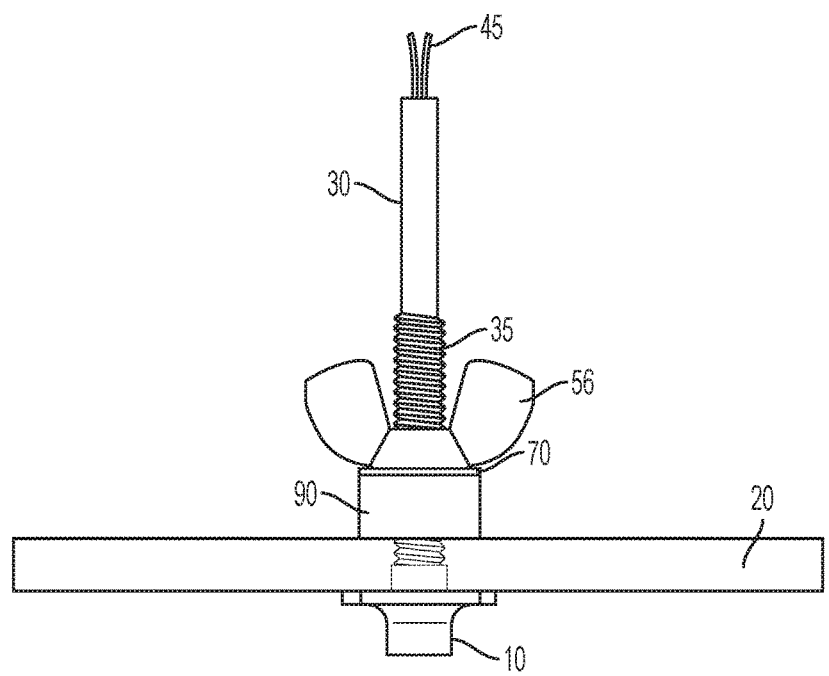
FIG. 3D is a schematic view of a nutplate retention system adhering a nutplate to a panel according to one or more embodiments of the present disclosure.

Subassembly 1 of the nutplate retention system, as shown in FIG. 3B, is then fed through the aperture 25 of the panel 20 (FIG. 4, step 140). Referring to FIG. 3C, the securing mechanism is then applied over the rigid tube 30 until the threads are engaged (FIG. 4, step 150). Referring to FIG. 3D, the wing nut 56 is then tightened until the cup washer 90 and the flat washer 70 come in contact (FIG. 4, step 160). This wing nut 56 is tightened until the required clamping force necessary to produce the desired bondline thickness is achieved.

Next, the heating component 40 is inserted into the aperture of the rigid tube 30, at which point, curing is begun (FIG. 4, step 170). The rapid cure process may be carried out by operating a heater controller to deliver resistive heating via the heating component at the adhesive bondline. The heater controller may further monitor and regulate the heat profile over the rapid cure process through a feedback mechanism with the use of thermal sensors. The heater controller comprises microprocessor, temperature and power controllers, data input output ports, and temperature sensor components (e.g., thermocouple). Further, referring to FIG. 4, after the curing step, which may occur for 2 to 6 hours, the heating component 40 may be removed from the rigid tube 30 (FIG. 4, step 180). Finally, the rigid tube 30 and securing mechanism is removed from the nutplate 10. Further optional steps are contemplated, for example, testing the bond strength of adhesive cured by the rapid cure system, via tests such as nutplate push-off or torque-out tests, or adhesive strength testing such as T-Peel (ASTM D1876) or lap shear (ASTM D1002). Under the T-Peel test, the adhesive strength may be from 25 to 50 pound per linear inch (pli), or from 35 to 50 pli at room temperature. Under the lap shear test, the adhesive strength may be about 45,000 psi. Without being bound by theory, the panel 20 can be adhered to a nutplate 10 in significantly less than the typical 24 hour needed for room temperature cure. In one embodiment, the cure may take only 4 hours due to the localized heating.

Additionally, to monitor the adhesion of the nutplate 10 to the panel 20, the feedback temperature control mechanism may be utilized so that the desired temperature profile can be maintained irrespective of panel material. Referring to FIGS. 1, 7A-7C, and 8, the feedback temperature control mechanism may include at least one, but typically a plurality of thermocouples or temperature sensors in communication with a controller. Various suitable controllers, such as a power controller, a temperature controller, are contemplated as long as they can regulate specific parameters based on input from the thermocouple. In specific embodiments, the controller for the temperature and the power source for the heating component may be integrated into the same unit to form the rapid cure controller system.

Figure 8:
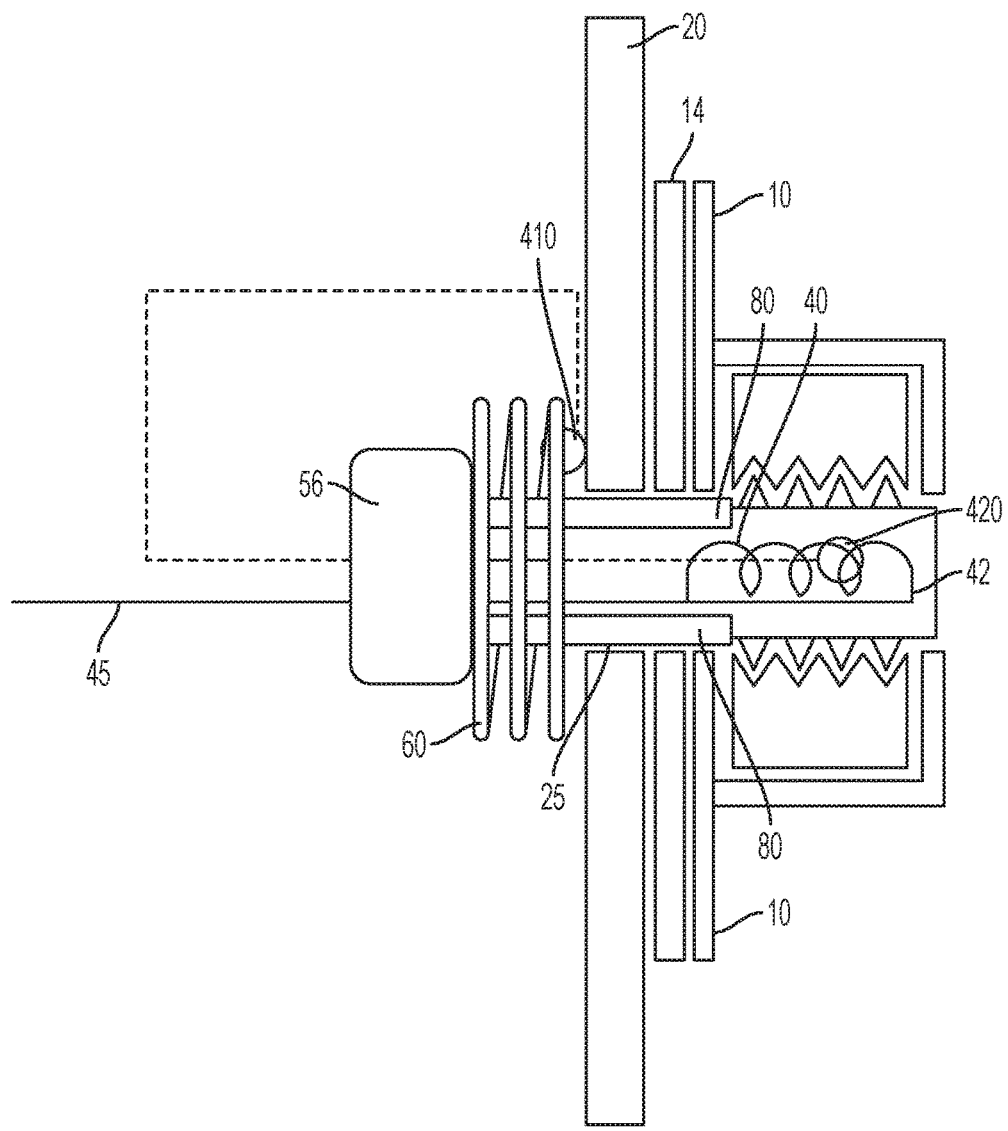
FIG. 8 is a schematic view of a nutplate retention system adhering a nutplate to a panel while utilizing multiple thermocouples, according to one or more embodiments of the present disclosure.

As shown in FIG. 7A, the panel 20 may have thermocouples 410 and 415 attached to opposite surfaces of the panel 20. Moreover, the heating component 40 may also have a thermocouple 420, which may be disposed at one end of the joule heating element 42. Additionally as shown in FIG. 7B, the domed region 15 of the nutplate 10 may include a thermocouple 405 and there also may a thermocouple 425 on the flat region 16 adjacent the domed region 15 of the nutplate 10. As shown in FIG. 8, the thermocouples are utilized in a feedback loop. For example, the thermocouple 410 on the surface of the panel 20 may output a high temperature reading that is indicative of an undesirable cure profile. Based on that reading, the controller triggers the joule heating element 42 to reduce the temperature and the heating element thermocouple 420 indicates when the heating element temperature is at the desired temperature. This process produces a controlled elevated temperature cure schedule profile to the adhesive bondline, so as to adequately cure the adhesive in a reduced time, for example, 4 hours or less.

In this accelerated cure process, the bulk of the material cure can occur in a shortened timespan to the desirable cure state, but further undesired reactions from elevated temperature "post-cure" are avoided. Without being bound by theory, in a polymer material such as a two-part epoxy adhesive, the reaction of smaller precursor molecules (e.g., monomers, pre-polymers) results in the growth of larger and increasing molecular weight chains of the constituent molecules. If the polymerization is allowed to proceed only at room temperature, the formation of networked polymer chains will gradually impede the mobility of remaining reactive molecules, essentially slowing down and eventually arresting the polymerization and cure of the material to achieve specified polymer properties. At an elevated temperature, the mobility of any remaining reactive molecules will be increased and thus increasing the polymerization rate of the material, thus reducing the time required to achieve a similar cure state comparing with curing at room temperature.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A method of adhering hardware to a substrate comprising:
    coupling the hardware with a rigid tube or an elastomeric tube;
    applying adhesive onto a bonding surface of the hardware;
    inserting the rigid tube or the elastomeric tube through an aperture of the substrate until a surface of the substrate contacts the bonding surface having adhesive applied thereon; and
    adhering the hardware to the substrate by applying localized heat through a heating component disposed within the rigid tube or the elastomeric tube.

2. The method of claim 1, wherein the hardware is a nutplate and the substrate is a panel.

3. The method of claim 2, wherein the elastomeric tube is utilized to secure the panel to the bonding surface of the nutplate during the adhering step.

4. The method of claim 2, further comprising removing the rigid tube or the elastomeric tube from the nutplate after the adhering step.

5. The method of claim 2, wherein the rigid tube threadedly engages the nutplate.

6. The method of claim 2, wherein the adhering step occurs for up to 4 hours.

7. The method of claim 2, further comprising a securing mechanism proximate the rigid tube which secures the nutplate in contact with the panel.

8. The method of claim 2, wherein the securing mechanism is coaxially disposed around the rigid tube.

9. The method of claim 8, wherein the securing mechanism comprises an elastomeric sleeve.

10. The method of claim 8, wherein the securing mechanism comprises at least one spring.

11. The method of claim 10, wherein the securing mechanism comprises at least one threaded nut and at least one washer which are utilized to ensure force is applied to the at least one spring.

12. The method of claim 2, wherein the adhesive comprises epoxy.

13. An adhesive bonded hardware cure system for securing hardware to a substrate comprising at least one aperture, the hardware cure system comprising:
- a rigid tube operable to engage the hardware at one end and extend through one aperture of the substrate;
- a securing mechanism proximate the rigid tube and configured to secure the hardware in contact with the substrate; and
- a heating component operable to deliver heat to a bonding surface of the hardware, wherein the heating component is operable to be removably inserted into the rigid tube or is coupled to the interior of the rigid tube.

14. The system of claim 13, wherein the hardware is a nutplate and the substrate is a panel.

15. The system of claim 14, wherein the securing mechanism is coaxially disposed around the rigid tube.

16. The system of claim 14, wherein the rigid tube is a threaded tube configured to threadedly engage the nutplate.

17. The system of claim 14, wherein the heating component comprises a joule heating element.

18. The system of claim 14, wherein the heating component is coupled to the interior of the rigid tube.

19. The system of claim 14, wherein the securing mechanism comprises an elastomeric sleeve.

20. The system of claim 14, wherein the securing mechanism comprises one or more holding components.

21. The system of claim 20, wherein the one or more holding components comprises a threaded nut, at least one washer, a spring, or combinations thereof.

22. The system of claim 14, wherein the rigid tube comprises metal.

23. An adhesive bonded hardware cure system for securing hardware to a substrate comprising at least one aperture, the hardware cure system comprising:
- an elastomeric tube operable to: 1) engage the hardware at one end; 2) extend through an aperture of the substrate; and 3) secure the hardware in contact with the substrate; and
- a heating component operable to deliver heat to a bonding surface of the hardware, wherein the heating component is operable to be inserted into the elastomeric tube or is coupled to the interior of the elastomeric tube.

24. The system of claim 23, wherein the hardware is a nutplate and the substrate is a panel.

25. The system of claim 23, wherein the heating component is coaxially disposed within the elastomeric tube.

26. The system of claim 23, wherein the heating component comprises a joule heating element.

* * * * *